(12) United States Patent
Stoll (10) Patent No.: US 7,290,966 B2
(45) Date of Patent: Nov. 6, 2007

(54) APPARATUS FOR DISLODGING AND MOVING CONTAMINANTS FROM A SURFACE OF A MACHINE TOOL

(75) Inventor: Alexander Stoll, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 267 days.

(21) Appl. No.: 10/908,836

(22) Filed: May 27, 2005

(65) Prior Publication Data

US 2006/0269376 A1    Nov. 30, 2006

(51) Int. Cl.
*B23Q 11/00* (2006.01)
(52) U.S. Cl. .................................. 409/137; 408/67
(58) Field of Classification Search ............... 409/137; 408/67; B23B 47/34; B23Q 11/02, 11/10
See application file for complete search history.

(56) References Cited

U.S. PATENT DOCUMENTS

| | | | |
|---|---|---|---|
| 2,619,009 A | 11/1952 | Begle | |
| 2,944,465 A | 7/1960 | Jones | |
| 3,837,383 A | 9/1974 | Ko | |
| 3,880,047 A | 4/1975 | Dosier | |
| 3,967,341 A | 7/1976 | Gavin | |
| 4,534,803 A * | 8/1985 | Asano et al. | 134/30 |
| 4,563,115 A * | 1/1986 | Abe et al. | 409/134 |
| 4,765,212 A | 8/1988 | Julius | |
| 4,935,981 A | 6/1990 | Ohtani et al. | |
| 5,002,139 A * | 3/1991 | Haussmann et al. | 175/293 |
| 5,474,116 A | 12/1995 | Shoda | |
| 5,685,039 A | 11/1997 | Hamada et al. | |
| 5,975,022 A | 11/1999 | Miller | |
| 6,036,412 A | 3/2000 | Dalla | |
| 6,061,865 A | 5/2000 | Susnjara et al. | |
| 6,079,078 A | 6/2000 | Byington | |
| 2005/0155626 A1 * | 7/2005 | Nordstrom et al. | 134/2 |

FOREIGN PATENT DOCUMENTS

| | | |
|---|---|---|
| DE | 33 20 598 A1 | 12/1984 |
| DE | 42 06 587 A1 | 9/1993 |
| DE | 19757424 A1 * | 6/1999 |
| EP | 1 179 388 A2 | 8/2001 |
| GB | 2 263 663 A | 8/1993 |
| JP | 58056749 A * | 4/1983 |
| JP | 60167706 A * | 8/1985 |
| JP | 63318206 A * | 12/1988 |
| JP | 03161236 A * | 7/1991 |
| JP | 03166036 A * | 7/1991 |
| JP | 2000233308 A * | 8/2000 |
| JP | 2004-105494 | 4/2004 |
| SU | 1565645 A1 | 5/1990 |
| SU | 1764946 A1 | 9/1992 |

* cited by examiner

*Primary Examiner*—Daniel W. Howell
(74) *Attorney, Agent, or Firm*—Raymond L. Coppiellie; Brooks Kushman P.C.

(57) ABSTRACT

An apparatus for dislodging contaminants from a surface of a machine tool. The apparatus includes a coupling, a housing, a cleaning mechanism, and a transport mechanism. The coupling is configured to be mounted on a spindle. The housing is disposed proximate the coupling and includes inlet and outlet openings. The cleaning mechanism is adapted to dislodge and direct contaminants into the inlet opening. The transport mechanism is adapted to move contaminants toward the outlet opening.

20 Claims, 10 Drawing Sheets

_Fig-6_

_Fig-7_

_Fig-7A_

APPARATUS FOR DISLODGING AND MOVING CONTAMINANTS FROM A SURFACE OF A MACHINE TOOL

BACKGROUND OF THE INVENTION

1. Field of the Invention

The present invention relates to an apparatus for removing contaminants from a surface of a machine tool.

2. Background Art

Machine tools can perform a variety of operations to shape and finish a part. Contaminants such as chips, dust, and lubricants are dispersed onto surfaces of the machine tool when such operations are performed. These contaminants must be periodically removed to maintain the stability and quality of the machining process.

Previously, operators cleaned machine tools by spraying pressurized air or coolant against contaminated surfaces to dislodge particulates. These manual operations were messy, time consuming, labor intensive, and resulted in increased machine downtime and associated costs.

Previously, dust collectors having a vacuum for suctioning particulates were provided around a cutting tool, such as that described in U.S. Pat. No. 3,837,383. However, such dust collecting apparatuses did not remove contaminants from machine tool surfaces.

Before applicant's invention, there was a need for an apparatus for efficiently cleaning a machine tool surface without extensive operator involvement. In addition, there was a need for an apparatus that incorporated a moveable cleaning member for dislodging contaminants from machine tool surfaces or associated components. In addition, there was a need for an apparatus that could move or transport dislodged contaminants away from the cleaned surface to inhibit recontamination. In addition, there was a need for an apparatus having a cleaning mechanism that could be actuated by a variety of power sources and accommodate various machine tool configurations. Problems associated with the prior art as noted above and other problems are addressed by applicant's invention as summarized below.

SUMMARY OF THE INVENTION

According to one aspect of the present invention, an apparatus for dislodging contaminants from a surface of a machine tool is provided. The machine tool includes a spindle. The apparatus includes a coupling, a housing, a cleaning mechanism, and a transport mechanism. The coupling is configured to be mounted on the spindle. The housing is disposed proximate the coupling and has inlet and outlet openings. The cleaning mechanism is configured to dislodge and direct contaminants into the inlet opening. The transport mechanism is adapted to move contaminants toward the outlet opening. The apparatus may be actuated by a variety of power sources, accommodate various machine tool configurations, and may be operated without extensive operator involvement.

The transport mechanism may be coupled to the coupling and may rotate when the spindle rotates. The transport mechanism may include a helical surface that extends at least partially between the cleaning mechanism and the coupling. The helical surface may be configured to move contaminants toward the outlet opening.

The housing may be configured not to turn when the coupling is rotated by the spindle. The housing may include a flow restriction disposed between the cleaning mechanism and the transport mechanism.

The cleaning mechanism may include a cleaning member disposed proximate the exterior surface. The cleaning mechanism may be configured to be rotated by the spindle and may be partially disposed in the housing.

The apparatus may include a pressurized fluid system for providing a pressurized fluid into the housing to move contaminants.

According to another aspect of the present invention, an apparatus for dislodging contaminants from a surface of a machine tool is provided. The machine tool includes a spindle adapted to rotate about an axis of rotation. The apparatus includes a coupling, a housing, a cleaning mechanism, and a transport mechanism. The coupling is configured to be attached to the spindle. The housing is disposed proximate the coupling and is configured not to rotate about the axis of rotation. The housing includes inlet and outlet openings. The cleaning mechanism is disposed proximate the inlet opening and is adapted to dislodge contaminants from the surface and direct contaminants into the housing. The transport mechanism is adapted to move contaminants through the housing toward the outlet opening.

The apparatus may include first and second cleaning mechanisms. The first and second cleaning mechanisms may be configured to rotate in opposite directions. The first cleaning mechanism may be spaced apart from the second cleaning mechanism.

The inlet opening may be disposed at a distal end of the housing disposed opposite the coupling or may be disposed between the coupling and the distal end.

A power source may be provided for rotating the cleaning mechanism. The cleaning mechanism may be configured to rotate about a cleaning mechanism axis of rotation that is not disposed parallel to the axis of rotation of the spindle.

According to another aspect of the present invention, an apparatus for dislodging contaminants from a surface of a machine tool. The apparatus includes a coupling, a housing, a cleaning mechanism, and a transport mechanism. The coupling is configured to be mounted on a spindle. The housing is disposed proximate the coupling and includes inlet and outlet openings. The cleaning mechanism is moveably disposed on the housing and is configured to dislodge and direct contaminants into the inlet opening. The transport mechanism includes a helical surface adapted to move contaminants from the inlet opening toward the outlet opening.

The cleaning and transport mechanisms may be adapted to turn when the spindle rotates. The cleaning mechanism may include an exterior surface. A cleaning member, which may be a plurality of bristles, may be disposed proximate the exterior surface.

DETAILED DESCRIPTION OF THE PREFERRED EMBODIMENT(S)

Figure 1:
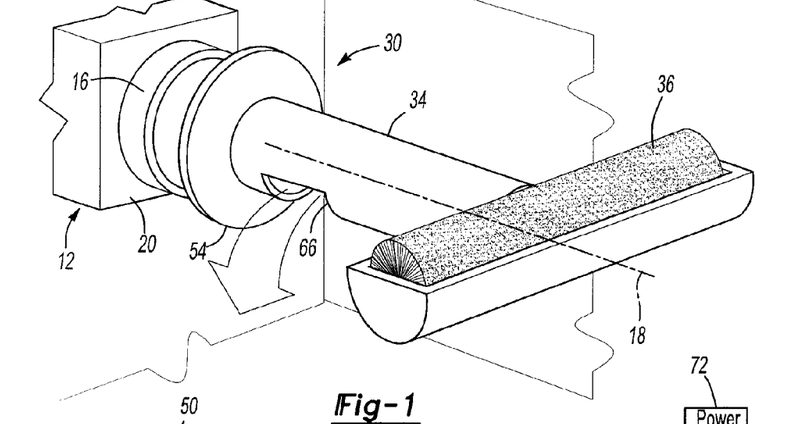
FIG. 1 is a perspective view of one embodiment of a cleaning apparatus.

Referring to FIG. 1, a machine tool 10 is shown. The machine tool 10 may be of any suitable type, such as a computer numerical control (CNC) machine tool, press, or assembly device. In addition, the machine tool 10 may be configured to perform any suitable shaping or finishing operation, such as cutting, shaving, turning, boring, drilling, grinding, reaming, deburring, tapping, forming, milling or polishing. Moreover, the machine tool 10 may be configured with a minimum quantity lubrication (MQL) system in which a fluid, such as coolant, may not be provided.

In the embodiment shown in FIG. 1, the machine tool 10 includes a spindle assembly 12 and a spindle housing 14. The spindle assembly 12 includes a spindle 16 adapted to rotate about an axis of rotation 18 and a spindle case 20. The spindle 16 may be turned by any suitable device, such as a motor, and at any suitable speed. In addition, the machine tool 10 may be configured to move the spindle assembly 12 along different axes, such as X, Y, and/or Z axes in a manner known by those skilled in the art.

The spindle housing 14 may include a plurality of panels disposed around and spaced apart from the spindle assembly 12. The spindle housing 14 may have any suitable configuration and may include doors and/or windows. The spindle housing 14 may be made of any suitable material, such as sheet metal. The spindle housing 14 inhibits contaminants, such as chips, dust, lubricants, particulates, oil mist, and other matter, from escaping to the surrounding environment. In addition, the spindle housing 14 may receive or include a contaminant bin or chip hopper that receives loose contaminants.

Figure 2:
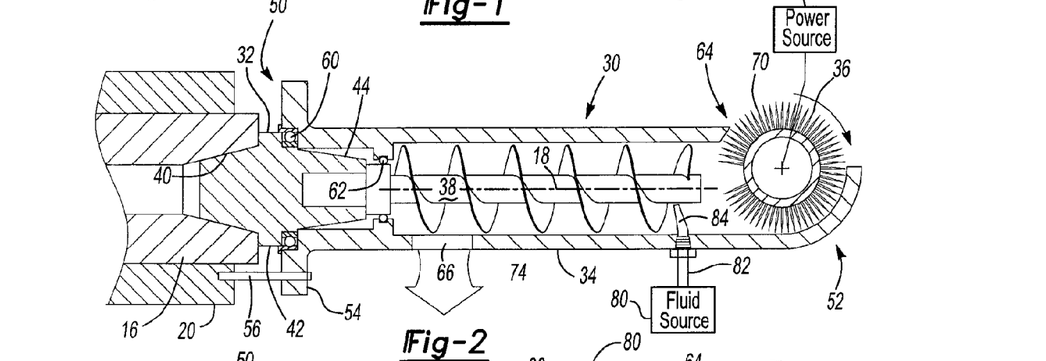
FIG. 2 is a section view of the cleaning apparatus shown in FIG. 1.

Referring to FIGS. 1 and 2, one embodiment of a cleaning apparatus 30 is shown. In this embodiment, the cleaning apparatus 30 includes a coupling 32, a housing 34, a cleaning mechanism 36, and a transport mechanism 38.

The coupling 32 is adapted to selectively couple the cleaning apparatus 30 to the spindle 16. The coupling 32 may be of any suitable type, such as a friction coupling or a quick connect coupling. In addition, the coupling 32 may have any suitable configuration. In the embodiment shown in FIG. 2, the coupling 32 includes a spindle mating portion 40 and a body portion 42 having a tubular section 44. The spindle mating portion 40 is adapted to engage the spindle 16. The body portion 42 is disposed adjacent to the spindle mating portion 40 and may extend along the axis of rotation 18. Optionally, the coupling 32 may be configured with one or more passages for supplying pneumatic, hydraulic, or electrical power to the cleaning apparatus component and/or a pressurized fluid, such as air, $CO_2$ or a cleaning solution, to help transport contaminants.

The housing 34 may be disposed proximate the coupling 32. The housing 34 may be made of any suitable material, such as a polymeric material or a metal. In addition, the housing 34 may have any suitable configuration. In the embodiment shown in FIGS. 1 and 2, the housing 34 is disposed coaxially with the axis of rotation 18. Alternately, the housing 34 or a portion thereof may not be coaxially disposed. For instance, at least a portion of the housing 34 may be angled or curved. The housing 34 may have a fixed or adjustable length. In addition, the housing 34 may have any suitable shape or cross section(s). In addition, the housing 34 may have any suitable orientation relative to the coupling 32 and may be moved in any suitable direction as discussed in more detail below.

The housing 34 may include a first end 50 and a second end 52. The first end 50 may be disposed near or adjacent to the coupling 32. In the embodiment shown, the first end 50 includes a flange 54 and an anti-rotation pin 56. The anti-rotation pin 56 may engage a hole 58 disposed on a non-rotating machine tool surface or component, such as the spindle case 20. The anti-rotation pin 56 inhibits rotation of the housing 34 when the coupling 32 rotates. Optionally, the anti-rotation pin 56 may be a conduit for providing pneumatic, hydraulic, or electrical power to drive or provide additional torque to the cleaning and/or transport mechanisms 36,38.

One or more bearings may be provided to facilitate rotation of the coupling 32 relative to the housing 36. In the embodiment shown, a first bearing 60 is disposed between the coupling 32 and the first end 50 of the housing 34. Optionally, a second bearing 62 may be disposed between the housing 34 and the transport mechanism 38. The second bearing 62 may include a seal. Optionally, seal may be substituted for the second bearing 62.

The housing 34 may include one or more inlet openings adapted to receive contaminants and one or more outlet openings adapted to expel contaminants. In the embodiment shown, an inlet opening 64 is disposed proximate the second end 52 and an outlet opening 66 is disposed between the first and second ends 50,52. The inlet opening 64 may be configured to scoop contaminants, such as chips, when the spindle assembly 12 is moved. Optionally, one or more fixed position cleaning members, such as bristles or wipers, may be disposed proximate the inlet opening 64.

Optionally, a remote vacuum source may be provided that is directly or indirectly connected to the housing 36 and/or the outlet opening 66 to assist in the transport of contaminants. In addition, the vacuum source may be attached to one or more tubes that are disposed proximate the housing to provide suction to supplement the operation of the cleaning mechanism and/or transport mechanisms. For instance, a vacuum tube may be provided in a spiral configuration along the inside of the housing that includes a suction end disposed near the inlet opening 64.

The outlet opening 66 may be connected to a conduit and/or container, such as a bag or bin disposed inside and/or outside the spindle housing 14, that receives particulates and facilitates containment and disposal. Moreover, the outlet opening may be coupled to a hollow anti-rotation pin that is configured to direct particulates through a mating cavity in the spindle housing. Optionally, the outlet opening may be disposed proximate the coupling 32 such that particulates are transported through the coupling 32 and/or spindle assembly 12. Also, a mesh grid may be provided with one or more outlet openings. Different sized grids may be provided to separate particulates according to size.

The cleaning mechanism 36 is adapted to rotate and dislodge contaminants. In at least one embodiment, the cleaning mechanism 36 may be disposed proximate the second end 52. The cleaning mechanism 36 may include one or more cleaning members 70 adapted to contact a machine tool surface, such as the spindle housing 14, tooling, workpiece-holding fixtures, and/or material handling pallets, to dislodge contaminants. The cleaning mechanism 38 may be rotatably associated with the housing 34 at least partially disposed in the housing 34 as shown in FIG. 2.

The cleaning member 70 may be of any suitable type, such as a brush, bristles, ribs, wiper, textured surface, or flap. In addition, different types of cleaning members may be used in any combination. In the embodiment shown in FIGS. 1 and 2, the cleaning member 70 includes a plurality of bristles disposed on an exterior surface of the cleaning mechanism 36.

The cleaning member 70 may have any suitable configuration. For instance, multiple rows and/or lengths of bristles may be employed. The rows may be configured in any suitable pattern, including linear, curved, spiral, and/or serpentine patterns. Moreover, the bristles may be positioned at any suitable angle and may be coated or uncoated. A wiper may have a flat, angled, pointed, or rounded tip and may be disposed in any suitable pattern or angle. If multiple wipers are employed, the wipers may have different heights and/or different tip designs.

The cleaning member 70 may be made of any suitable material or materials. For example, bristles may be made of any suitable material, such as a polymeric material like nylon or a metal like brass. A wiper may be made of rubber, nylon, spring steel, or a polymeric material like ultrahigh molecular weight polypropylene (UHMW-PP). A flap may be made of a polymeric, woven, or lofted material.

The cleaning mechanism 36 may be driven by any suitable power source 72, such as the spindle 16 or any suitable pneumatic hydraulic, mechanical, or electrical device or system.

The transport mechanism 38 may be at least partially disposed in the housing 34 proximate the coupling 32 and/or cleaning mechanism 36. In the embodiment shown in FIG. 2, the transport mechanism 38 is coupled to the tubular section 44 of the coupling 32. The transport mechanism 38 may have any suitable configuration. In the embodiment shown, the transport mechanism 38 includes one or more helical surfaces 74.

The helical surface 74 at least partially extends along the transport mechanism 38. In the embodiment shown in FIG. 2, the helical surface 74 is disposed between the coupling 32 and the cleaning mechanism 36 and facilitates the movement of contaminants toward the outlet opening 66 when the transport mechanism 38 is rotated in a predetermined direction. In addition, the transport mechanism 38 may be connected to a transmission that controls rotational velocity. Optionally, the helical surface 74 may include a cleaning member, such as bristles or a wiper, to facilitate movement of contaminants through the housing 34.

Figure 2A:
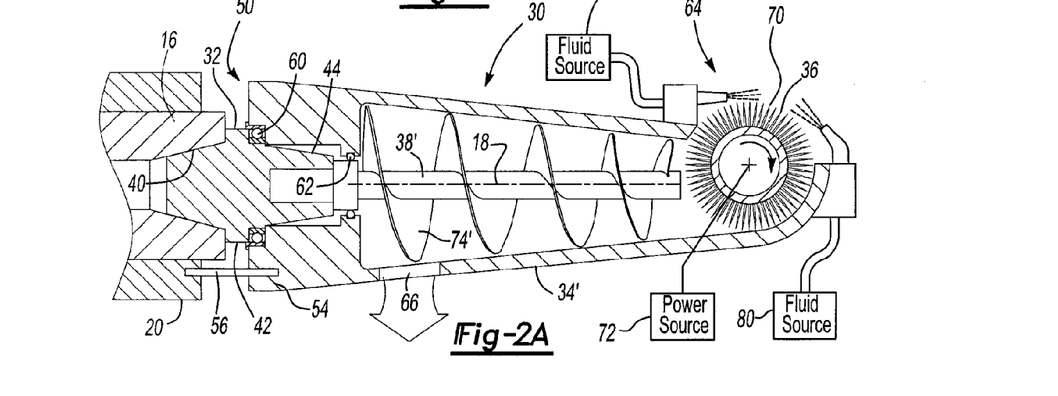
FIG. 2A is a section view of a second embodiment of the cleaning apparatus.

The helical surface 74 may have any suitable configuration. For instance, the helical surface 74 may have constant or non-constant spacing and/or a constant or non-constant diameter. In the embodiment shown in FIG. 2, the helical surface 74 has a constant spacing along the transport mechanism 38 and a constant diameter. In at least one embodiment, the spacing and/or the diameter may change along the length of the transport mechanism 38. For instance, in the embodiment shown in FIG. 2A, the spacing and diameter of the helical surface 74' of the transport mechanism 38' increases as the distance from the cleaning mechanism 36 increases. The increased spacing and/or diameter may provide additional capacity to help reduce clogging and to facilitate the movement of contaminants through the housing 34'. Moreover, the housing 34' diameter may be configured to accommodate the cleaning mechanism configuration.

Optionally, a pressurized fluid source 80 may be provided to help move contaminants through the housing 34 to clean the transport mechanism 38 and/or helical surface 74. In the embodiment shown, the pressurized fluid source 80 provides a fluid, such as air, $CO_2$ or a cleaning solution, into the housing 34 via a rigid or flexible hollow member, generically referred to as a pipe 82. In addition, a nozzle 84 may be provided at an end of the pipe 82. In at least one embodiment, the pipe 82 or a similar passage may be routed through the spindle assembly 12 and/or coupling 32. Moreover, the pipe 82 may be disposed proximate an interior or exterior surface of the housing 34. In at least one other embodiment, the fluid source 80 may be connected to one or more nozzles disposed at least partially around the inlet opening 64 to direct contaminants toward the cleaning mechanism 36 or an area which may be engaged by cleaning mechanism 36. For instance, a fluid such as air may be used to provide an air curtain to help concentrate, contain, and/or move contaminants.

Another optional feature that may be provided is a heating element disposed proximate the housing 32 and/or the transport mechanism 38 for drying particulates to facilitate transportation and to help prevent or reduce particulates from adhering or sticking to these components.

Additional cleaning apparatus embodiments will now be described. For convenience and clarity, these embodiments include features and components similar to those shown in FIGS. 1 and 2, such as the machine tool 10 and coupling 32. Consequently, common reference numbers are used to designate these components and their associated features in the embodiments presented below. In addition, optional features such as a remote vacuum source, pressurized fluid source, and any of the internal or externally oriented fluid outlets or nozzles described above may be provided with each of the embodiments presented below and in any combination unless otherwise indicated. Furthermore, components having common names regardless of their reference number may include some or all of the attributes associated with like-named features described above and with reference to one or more embodiments described below.

Figure 3:
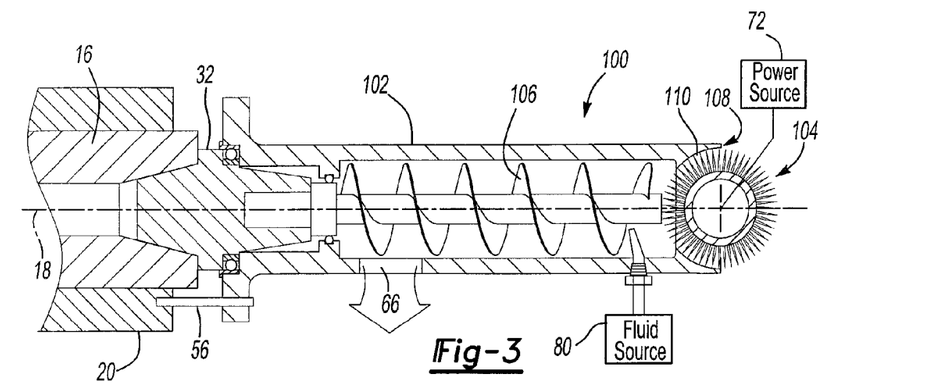
FIG. 3 is a section view of a third embodiment of the cleaning apparatus having a flow restriction portion.

Referring to FIG. 3, another embodiment of a cleaning apparatus is shown. In this embodiment, the cleaning apparatus 100 includes a housing 102, a cleaning mechanism 104, and a transport mechanism 106. The housing 102 includes an inlet opening 108 located at a housing end disposed opposite the coupling 32. The cleaning mechanism 104 may be rotatably associated and at least partially disposed in the housing 102 and may be driven in any suitable manner as previously described. The transport mechanism 106 may be spindle-driven and have a configuration similar to that shown in FIG. 2.

The cleaning apparatus 100 may also include one or more flow restrictions 110 disposed near the cleaning mechanism 104. The flow restriction 110 is configured to at least partially reduce size of the inlet opening 108 to inhibit contaminants, such as chips, from accumulating and/or clogging the housing 102. The cleaning and/or transport mechanisms 104,106 may or may not contact the flow restriction 110 during operation.

The flow restriction 110 may be disposed in any suitable location, such as adjacent or spaced apart from the end of the housing 102. In addition, the flow restriction 110 may have any suitable configuration. In the embodiment shown in FIG. 3, the flow restriction 110 has an annular configuration and protrudes from an interior surface of the housing 102. Alternatively, the flow restriction 110 may be intermittently or periodically provided on the interior surface.

Figures 4A, 4B, 4C, 5:
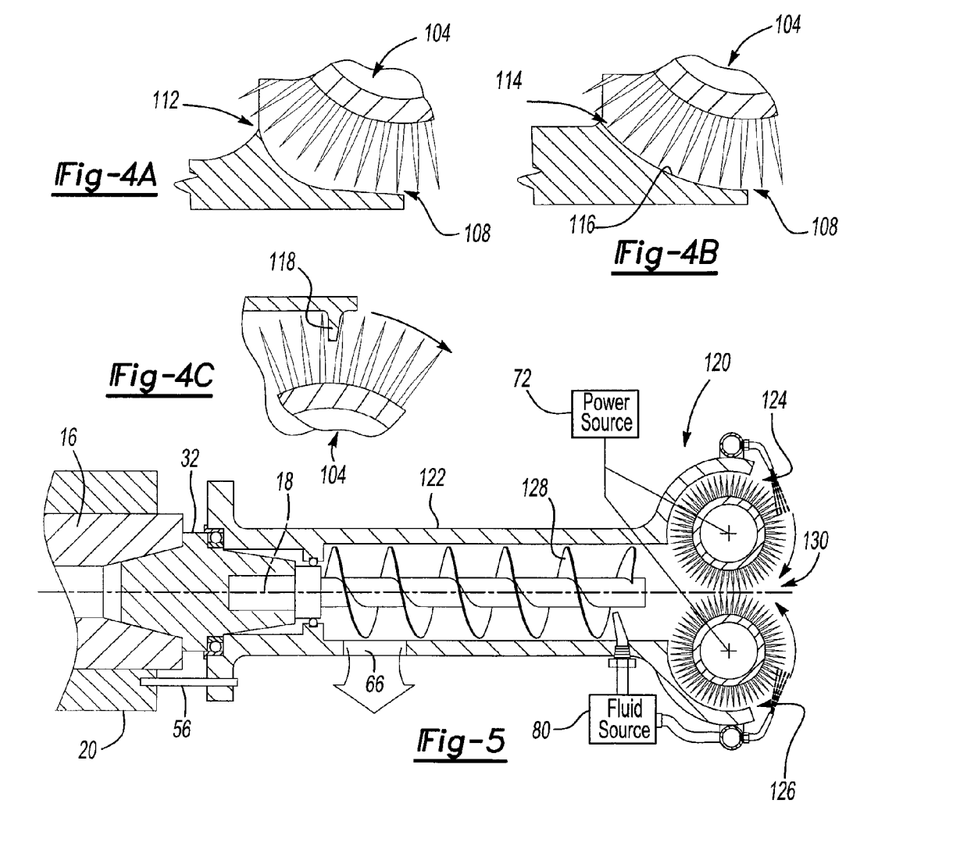
FIGS. 4A-4C are section views of various embodiments of the flow restriction portion.
FIG. 5 is a section view of a fourth embodiment of the cleaning apparatus.

The flow restriction may have any suitable shape or cross section and may include any combination of surfaces. In FIG. 3, the flow restriction 110 has a generally triangular cross section having flat and curved surfaces. In FIG. 4A, the flow restriction 112 includes a plurality of generally concave curved surfaces to aid in the movement of chips and other contaminants. Alternatively, the flow restriction may not extend from the interior surface of the housing. For instance, in FIG. 4B a flow restriction 114 is provided by a contoured surface 116 formed in an interior surface of the housing. In at least one embodiment, the flow restriction may not protrude from adjacent interior surfaces of the housing. In various embodiments, such as that shown in FIG. 4C, the flow restriction may contact the cleaning member to help dislodge particulates. In various embodiments, flow restrictions may be provided in any suitable quantity.

Referring to FIG. 5, another embodiment of a cleaning apparatus is shown. This embodiment is similar to that shown in FIG. 3, but includes a plurality of cleaning mechanisms. More specifically, the cleaning apparatus 120 includes a housing 122, first and second cleaning mechanisms 124,126, and a transport mechanism 128. The transport mechanism 128 may be spindle-driven and have a configuration similar to that shown in FIG. 2.

The housing 122 includes an inlet opening 130 disposed opposite the coupling 32. The cleaning mechanisms 124,126 may be at least partially disposed in the housing 122. The cleaning mechanisms 124,126 may have the same or different configurations and may have parallel or non-parallel axes of rotation. The housing 122 may encompass or wrap around a portion of one or more of the cleaning mechanisms 124,126 to inhibit spraying or dispersing dislodged contaminants.

The cleaning mechanisms 124,126 may be rotatably associated with the housing 122 and driven in any suitable manner as previously described. Moreover, the cleaning mechanisms 124,126 may be driven at the same or different velocities and in the same or different directions. In the embodiment shown, the cleaning mechanisms 124,126 rotate in opposite directions to help direct contaminants into the housing 122 and to inhibit contaminants from accumulating and/or clogging the housing 122.

Figure 6:
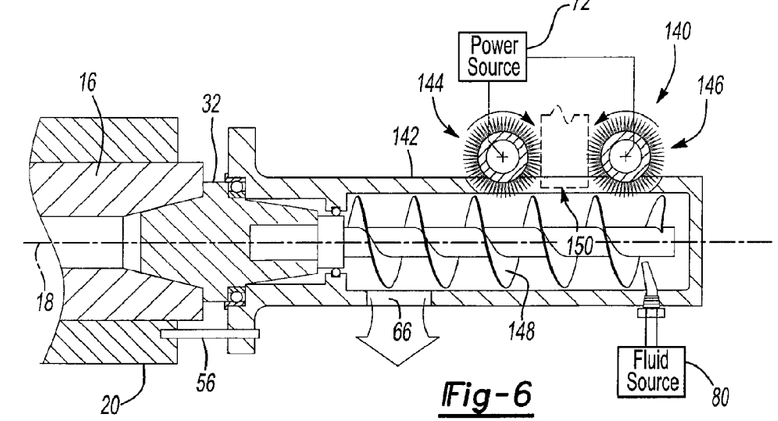
FIG. 6 is a section view of a fifth embodiment of the cleaning apparatus.

Referring to FIG. 6, another embodiment of a cleaning apparatus is shown. In this embodiment, the cleaning apparatus 140 includes a housing 142, first and second cleaning mechanisms 144,146, and a transport mechanism 148.

The housing 142 may include an inlet opening 150 disposed between the coupling 32 and a distal end disposed opposite the coupling 32. The cleaning mechanisms 144,146 may be at least partially disposed in the housing 142. Moreover, the cleaning mechanisms 144,146 may have the same or different configurations, may have parallel or non-parallel axes of rotation, and may be driven in any suitable manner as previously described.

The cleaning mechanisms 144,146 may be rotatably associated with the housing 142 and may be spaced apart to receive or engage another component. For example, a gap may be provided between cleaning mechanisms 144,146 for receiving a shaft, tool shank, or other protrusion in the spindle housing 14. This type of configuration permits the cleaning apparatus 140 to clean surfaces of non-planar components or irregularly shaped components, thereby providing additional flexibility in cleaning complex machine tool surfaces.

Figure 7:
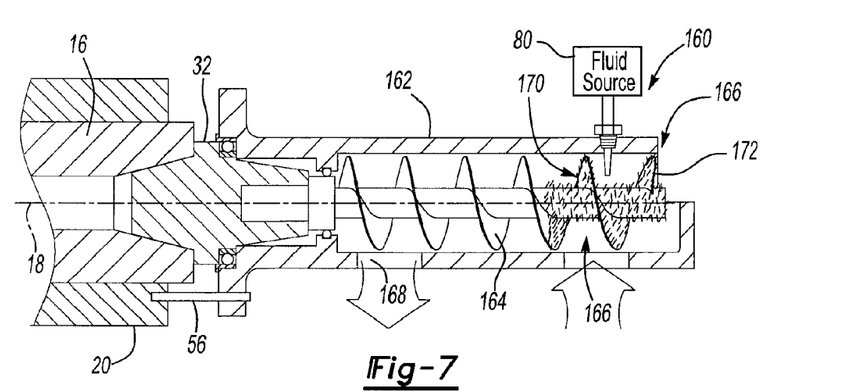
FIG. 7 is a section view of a sixth embodiment of the cleaning apparatus.

Referring to FIG. 7, another embodiment of a cleaning apparatus is shown. In this embodiment, the cleaning apparatus 160 includes a housing 162, and a cleaning and transport mechanism 164. The housing 162 may include one or more inlet openings 166 and one or more outlet openings 168.

The cleaning and transport mechanism 164 includes features for dislodging contaminants and transporting contaminants toward the outlet opening 168. The cleaning and transport mechanism may have any suitable configuration. In the embodiment shown, the cleaning and transport mechanism 164 has a generally helical configuration adapted to move contaminants through the housing 162 when the cleaning and transport mechanism 164 is rotated. The outlet opening 168 may have any suitable configuration. For example, the outlet opening may extend completely or partially across the end of the housing 162 disposed near the distal end of the transport mechanism 164.

The cleaning and transport mechanism 164 may include a cleaning portion 170 at least partially disposed in the housing 162. The cleaning portion 170 may have any suitable configuration and may include one or more cleaning members 172, such as bristles, wipers or flaps in any suitable combinations and configurations to facilitate movement of contaminants through the housing 162. Moreover, the cleaning portion 170 may have a non-helical configuration and may be integrally formed with or attached to the remainder of the cleaning and transport mechanism 164 in any suitable manner, such as with fasteners or an adhesive.

Figure 7A:
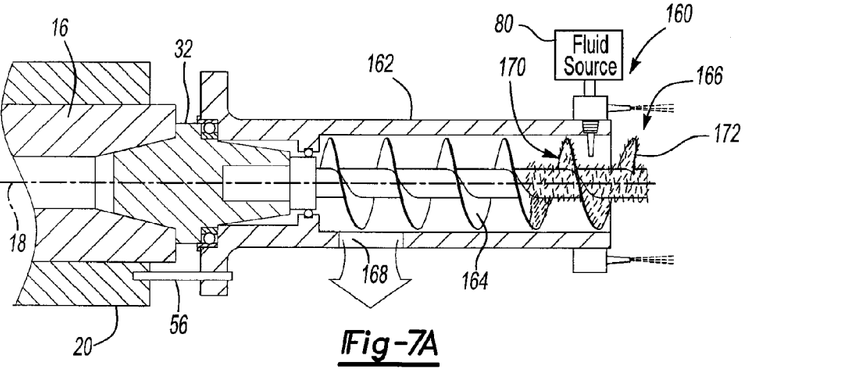
FIG. 7A is a section view of a seventh embodiment of the cleaning apparatus.

Optionally, a plurality of generally parallel cleaning and transport mechanisms may be provided that extend at least partially through an inlet opening 166 disposed at the end of the housing 162 opposite the coupling as shown in FIG. 7A.

Figure 8:
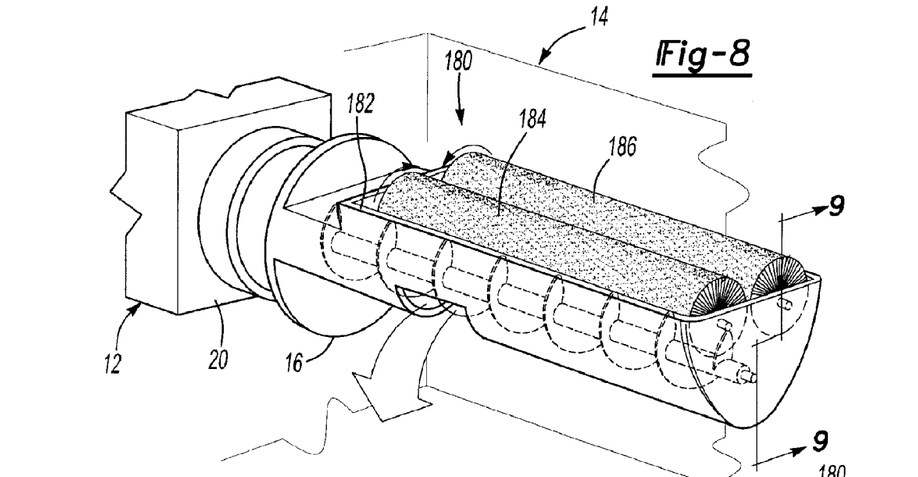
FIG. 8 is a perspective view of an eighth embodiment of the cleaning apparatus.
Figure 9:
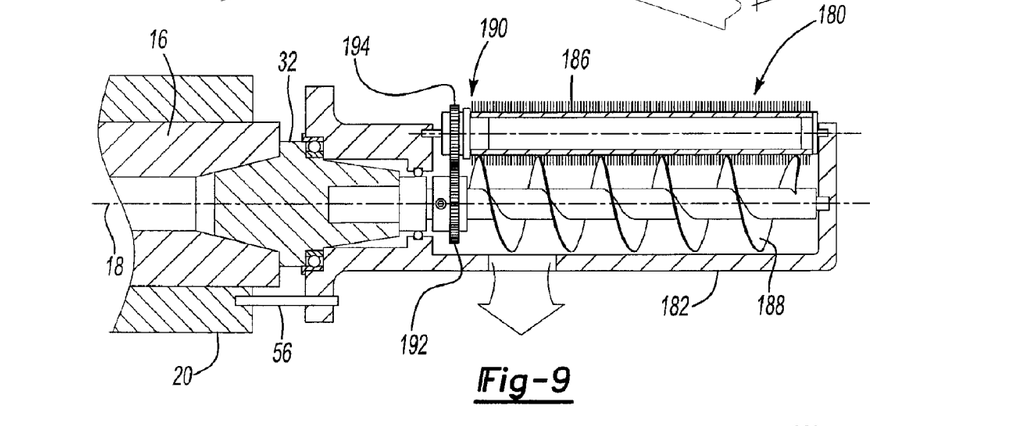
FIG. 9 is a section view of the cleaning apparatus shown in FIG. 8 along line 9-9.

Referring to FIGS. 8 and 9, another embodiment of a cleaning apparatus is shown. In this exemplary embodiment, the cleaning apparatus 180 includes a housing 182, first and second cleaning mechanisms 184,186, and a transport mechanism 188. The present invention also contemplates embodiments having one or more cleaning mechanisms and more than one transport mechanism.

The cleaning mechanisms 184,186 may be rotatably associated with and at least partially disposed in the housing 182. Moreover, the cleaning mechanisms 184,186 may have the same or different configurations and may be driven in any suitable manner as previously described. In the embodiment shown, the cleaning mechanisms are generally disposed parallel to each other and to the transport mechanism 188. In addition, the cleaning mechanisms 184,186 and transport mechanism 188 have generally parallel axes of rotation.

The cleaning and transport mechanisms 184,186,188 may be driven with the same or different power sources and may be driven at different velocities and/or in different directions. In the embodiment shown, the cleaning and transport mechanisms 184,186,188 are associated with a drive mechanism that permits the spindle 16 to rotate each mechanism 184,186,188.

Referring to FIG. 9, the cleaning apparatus 180 is shown in more detail and includes one embodiment of a drive mechanism 190. The drive mechanism 190 includes a drive gear 192 disposed proximate the transport mechanism 188 and a driven gear 194 associated with each cleaning mechanism 184,186. The drive and driven gears 192,194 may be fixedly coupled to a shaft portion of each mechanism 184,186,188. Optionally, one or more intermediate gears may be disposed between the drive and driven gears 192,194 to achieve a desired gear ratio or direction of rotation in a manner known by those skilled in the art. Moreover, one of ordinary skill in the art will recognize that a variety of different gear types and configurations may be provided to effect rotational movement.

Figure 10:
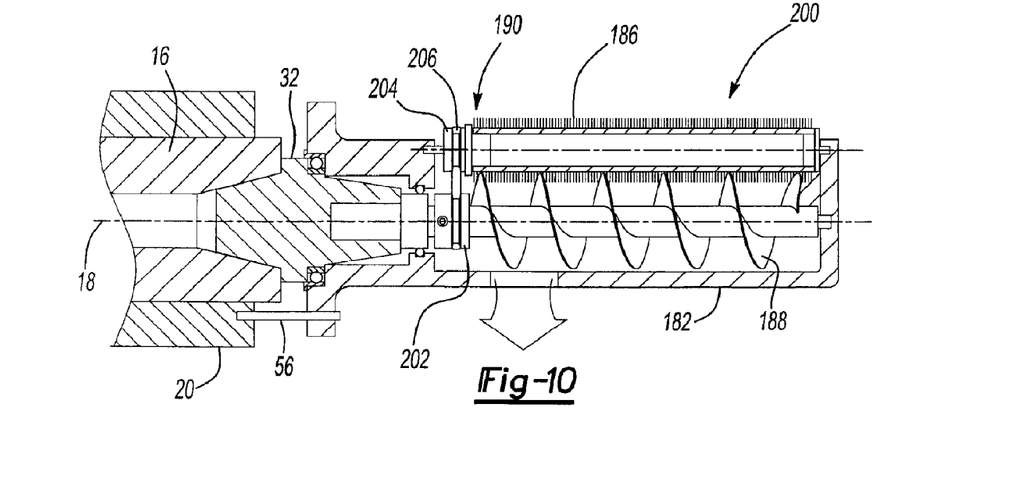
FIG. 10 is a section view of a ninth embodiment of the cleaning apparatus.

Referring to FIG. 10, another embodiment of a drive mechanism is shown. In this embodiment, the drive mechanism 200 includes a drive pulley 202 disposed proximate the transport mechanism 188 and a driven pulley 204 associated with each cleaning mechanism 184,186. The drive and driven pulleys 202,204 may be fixedly coupled to a shaft portion of each mechanism 184,186,188. Optionally, one or more intermediate pulleys may be disposed between the drive and driven pulleys 202,204 to achieve a desired ratio or direction of rotation in a manner known by those skilled in the art.

The drive mechanism 200 also includes one or more drive members 206. The drive member 206 is adapted to moveably couple the drive and driven pulleys 202,204 to affect rotation. The drive member 206 may be of any suitable type and may have any suitable configuration, such as a belt, chain, or rope.

Figure 11:
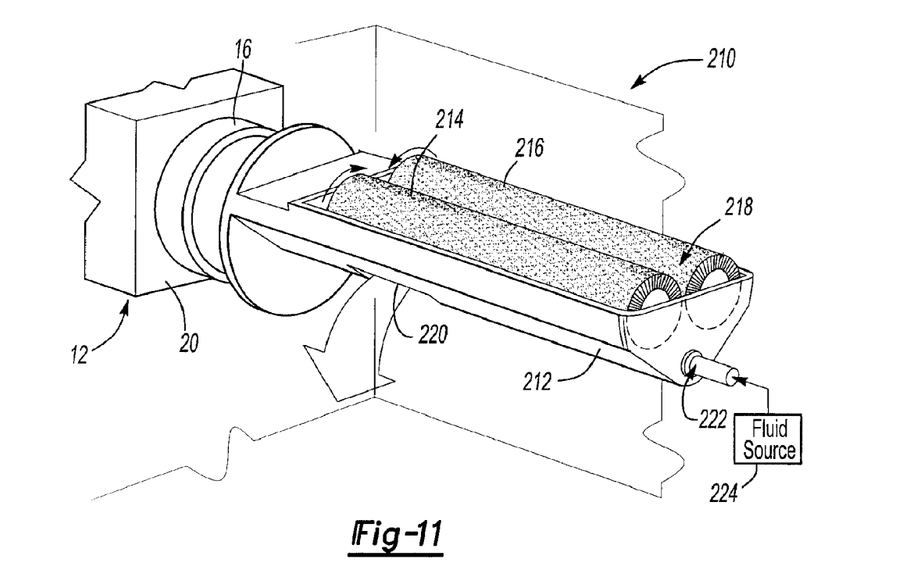
FIG. 11 is a perspective view of a tenth embodiment of the cleaning apparatus.

Referring to FIG. 11, another embodiment of a cleaning apparatus is shown. This embodiment is similar to that shown in FIG. 8 since it may include one or more cleaning mechanisms, but omits a mechanically driven transport mechanism. More specifically, the cleaning apparatus 210 includes a housing 212 and first and second cleaning mechanisms 214,216.

The housing 212 includes inlet and outlet openings 218, 220 as previously described. In addition, the housing includes one or more pressurized fluid inlets 222 for receiving a pressurized fluid, such as air, $CO_2$, or a cleaning solution, from a pressurized fluid source 224. The pressurized fluid inlet may be configured to direct pressurized fluid through the housing 212 toward the outlet opening 220 to move contaminants through and out of the housing 212.

The cleaning mechanisms 214,216 may be rotatably associated with and at least partially disposed in the housing 212 as previously described. Moreover, the cleaning mechanisms 214,216 may have the same or different configurations and may be driven in any suitable manner. For example, a spindle-driven embodiment may include a drive mechanism similar to that shown in FIGS. 10 and 11 but without the addition of a contaminant transporting surface or feature.

Figure 12:
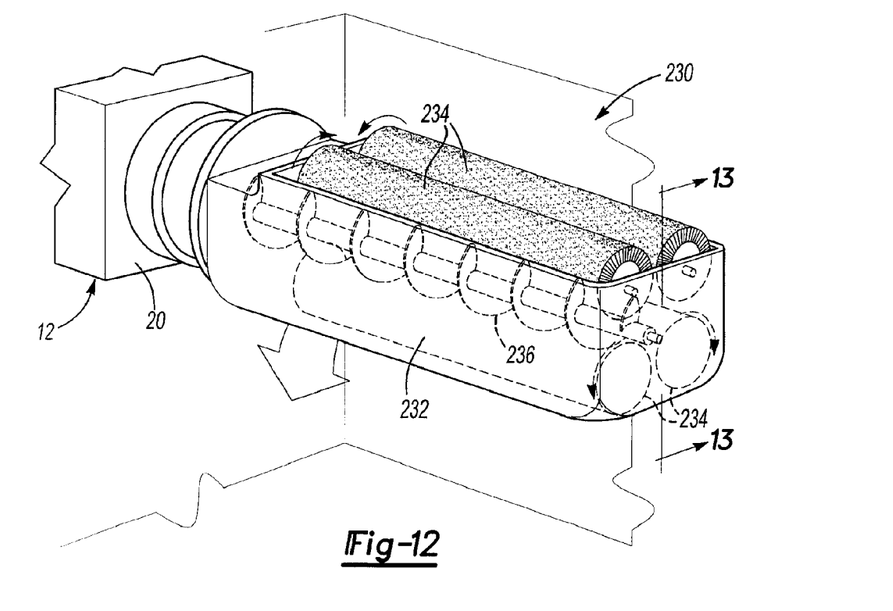
FIG. 12 is a perspective view of a eleventh embodiment of the cleaning apparatus.
Figure 13:
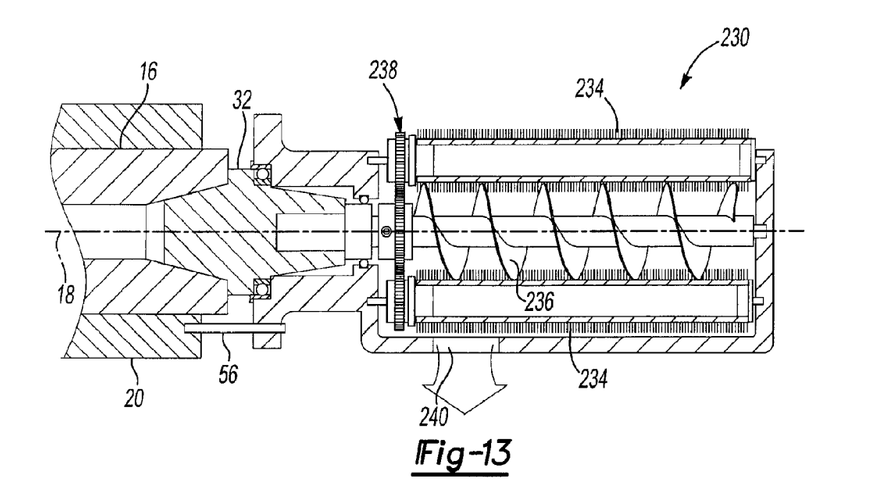
FIG. 13 is a section view of the cleaning apparatus shown in FIG. 12 along line 13-13.

Referring to FIGS. 12 and 13, another embodiment of a cleaning apparatus is shown. In the embodiment shown, the cleaning apparatus 230 includes a housing 232, a plurality of cleaning mechanisms 234, and a transport mechanism 236.

The cleaning mechanisms 234 may be rotatably associated with and at least partially disposed in the housing 232. Moreover, the cleaning mechanisms 234 may have the same or different configurations and may be driven in any suitable manner as previously described. In the embodiment shown, the cleaning mechanisms are generally disposed parallel to each other and to the transport mechanism 236. In addition, the cleaning mechanisms 234 and transport mechanism 236 have generally parallel axes of rotation.

The cleaning mechanisms 234 may be driven with the same or different power sources and may be driven at different velocities and/or in different directions. In the embodiment shown, the cleaning and transport mechanisms 234,236 are associated with a drive mechanism 238 that may have any suitable configuration as previously described. In the embodiment shown, the drive mechanism 238 includes a plurality of gears similar to that shown in FIG. 9.

Referring to FIG. 13, the cleaning and transport mechanisms 234,236 are shown in more detail. In this embodiment, the transport mechanism 236 is disposed between two or more cleaning mechanisms 234. Moreover, the transport mechanism 236 is longer than at least one transport mechanism 234 so that contaminants may pass to the outlet opening 240 of the housing 232. In the embodiment shown, the transport mechanism 236 is configured to receive contaminants from each cleaning mechanism 234 and move the contaminants toward the outlet opening 240.

Figure 14:
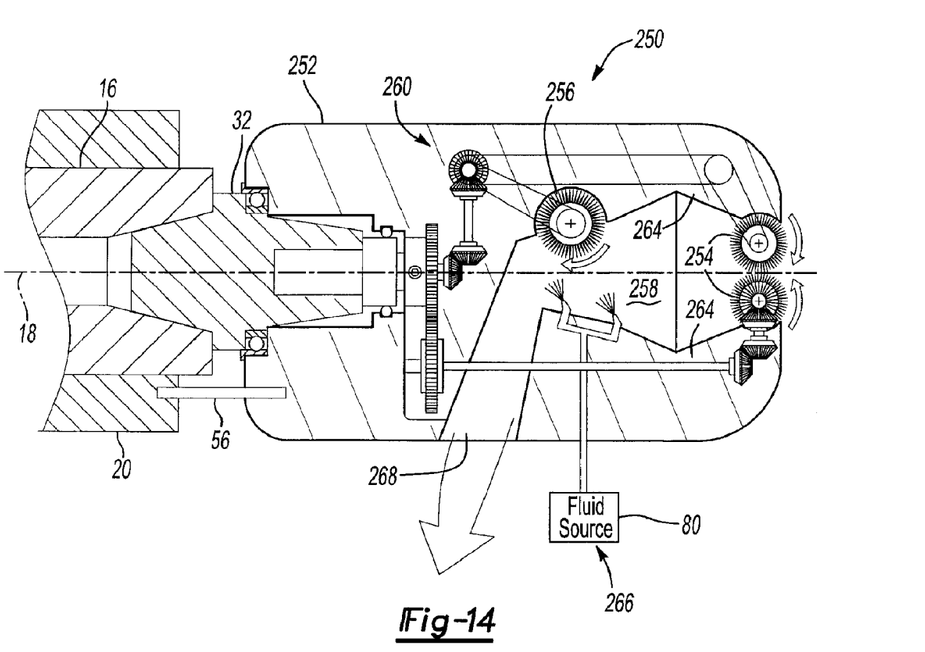
FIG. 14 is a section view of a twelfth embodiment of the cleaning apparatus.

Referring to FIG. 14, another embodiment of a cleaning apparatus is shown. In this embodiment, cleaning apparatus 250 includes a housing 252, one or more cleaning mechanisms 254, and one or more transport mechanisms 256.

The cleaning mechanisms 254 may be rotatably associated with and at least partially disposed in the housing 252. Moreover, the cleaning mechanisms 254 may have the same or different configurations and may be driven in any suitable manner as previously described. In the embodiment shown, the cleaning mechanisms are generally disposed parallel to each other and generally perpendicular to the axis of rotation 18 of the spindle 16. The cleaning mechanisms may direct dislodged contaminants into a cavity disposed in the housing 258.

The transport mechanism 256 is configured to direct contaminants toward the outlet opening. The transport mechanism 256 may have any suitable configuration. In the embodiment shown, the transport mechanism includes a cleaning member configured as a plurality of bristles.

The cleaning and transport mechanisms 254,256 may be driven with the same or different power sources and may be driven at different velocities and/or in different directions. In the embodiment shown, the cleaning and transport mechanisms 254,256 are associated with a drive mechanism 260 that may have any suitable configuration.

The drive mechanism 260 may include a lower portion 262 and an upper portion 264. The lower portion 262 includes a plurality of gears and shafts for transmitting the rotational energy from the spindle 16 to the cleaning mechanism 254 disposed in the lower region of FIG. 14. Similarly the upper portion 264 includes a plurality of drive members, such as belts and pulleys for transmitting rotational energy from the spindle 16 to the transport mechanism 256 and the cleaning mechanism 254 disposed in the upper region of FIG. 14. The components of the drive mechanism 260, such as shafts, pulleys and gears, may be arranged and supported in any suitable manner as previously described and as is known by those skilled in the art. For example, the components of the drive mechanism 260 may be disposed in cavities or passages in the housing 252.

An optional pressurized fluid system 266 is also shown that may be configured to provide a pressurized fluid, such as air, $CO_2$, or a cleaning solution, to help move particulates toward the outlet opening 268 of the housing 252.

Figure 15:
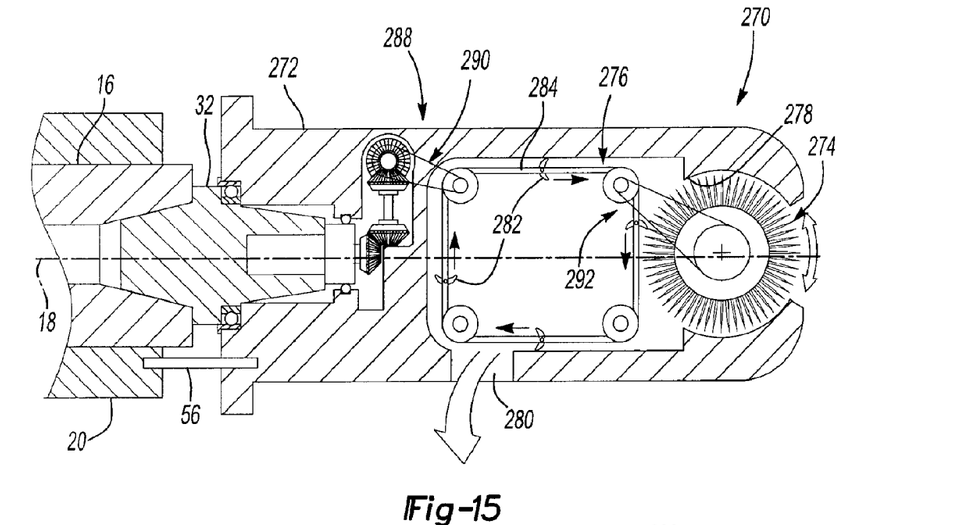
FIG. 15 is a section view of an thirteenth embodiment of the cleaning apparatus.

Referring to FIG. 15, another embodiment of a cleaning apparatus is provided. In this embodiment, the cleaning apparatus 270 includes a housing 272, at least one cleaning mechanism 274, and a transport mechanism 276.

The cleaning mechanisms 274 may have any suitable configuration as described above. In the embodiment shown in FIG. 15, the cleaning mechanism 274 is configured similar to that shown in FIG. 3 and includes a flow restriction 278. The cleaning mechanism 274 may direct dislodged contaminants into a cavity disposed in the housing 272.

The transport mechanism 276 is configured to direct contaminants toward the outlet opening 280. In the embodiment shown, the transport mechanism includes one or more scoops 282. The scoops 282 are disposed in the housing 272 and are configured to move in a loop to push or pull contaminants toward the outlet opening 280. For example, the scoops may be attached to a drive member 284, such as a belt, chain, linkage, or bar that is moveably associated with one or more guides 286, such as a pulley, wheel, or bearing.

The cleaning and transport mechanisms 274,276 may be driven with the same or different power sources and may be driven at different velocities and/or in different directions. In the embodiment shown, the cleaning and transport mechanisms 274,276 are associated with a drive mechanism 288 that may have any suitable configuration.

The drive mechanism 288 may have any suitable configuration. For example, the drive mechanism may include gears, drive members, pulleys, etc. as previously describe and may be powered by the spindle 16 or another power source. In the embodiment shown, a first drive member 290 is provided for driving the transport mechanism 274 and a second drive member 292 is provided to connect the transport mechanism 274 to the cleaning mechanism 276.

Figure 16:
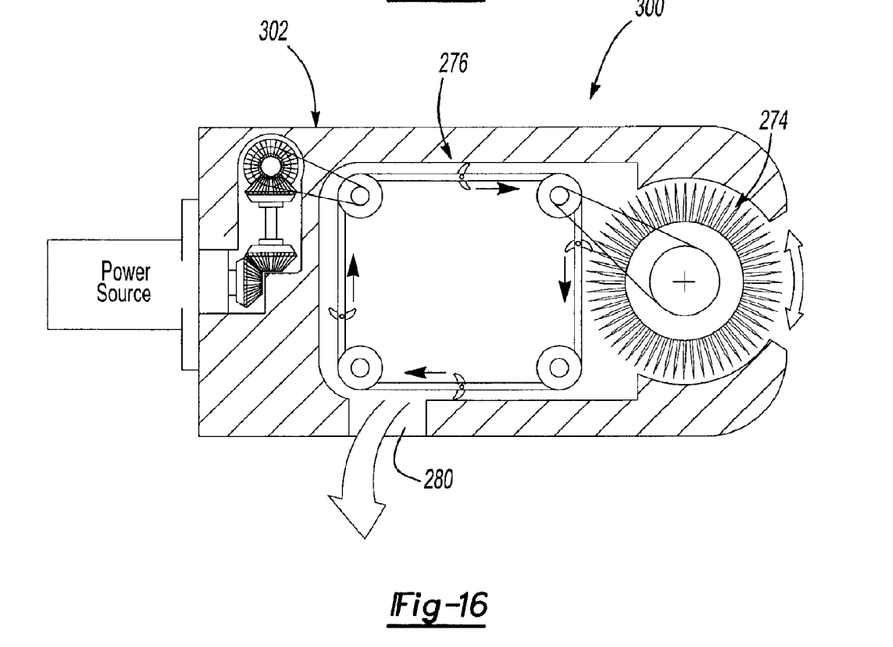
FIG. 16 is a section view of a fourteenth embodiment of the cleaning apparatus.

Referring to FIG. 16, another embodiment of the cleaning apparatus 300 is shown. In this embodiment, the cleaning apparatus 300 has a similar configuration as that shown in FIG. 15. However, the housing 302 is not configured to be mounted on a spindle.

Figure 17:
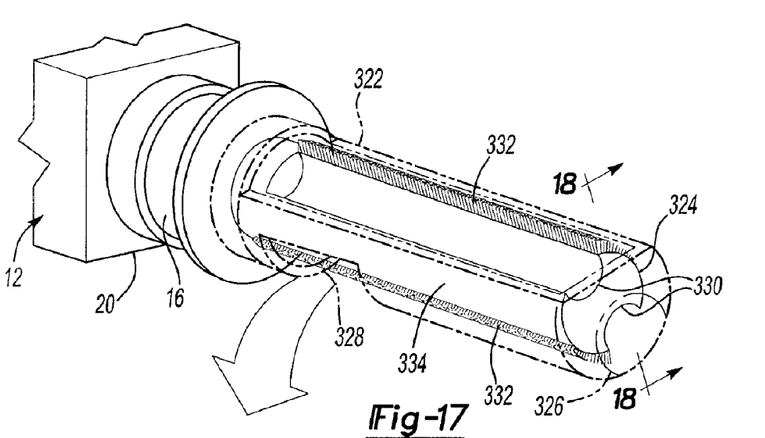
FIG. 17 is a perspective view of a fifteenth embodiment of the cleaning apparatus.
Figure 18:
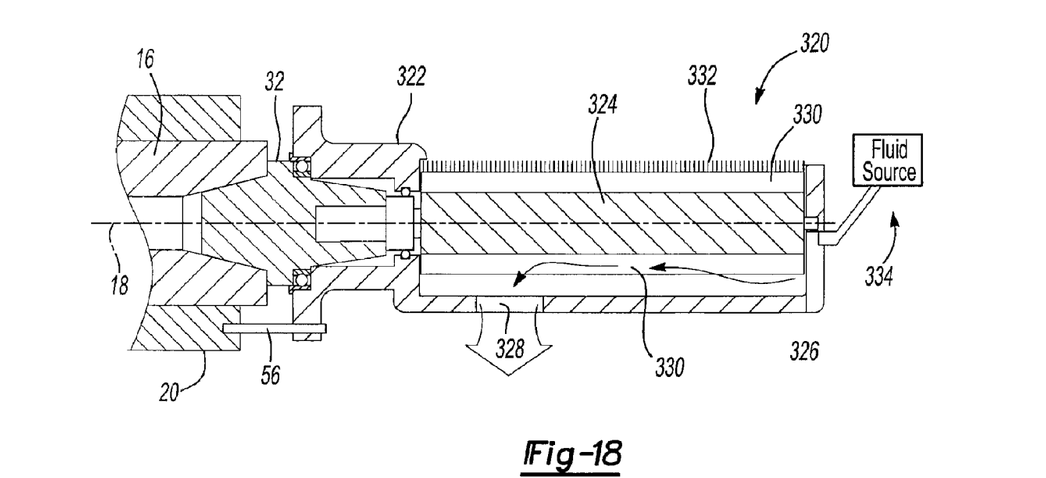
FIG. 18 is a section view of the cleaning apparatus shown in FIG. 17 along line 18-18.

Referring to FIGS. 17 and 18, another embodiment of the cleaning apparatus is shown. In this embodiment, the cleaning apparatus 320 includes a housing 322 and a cleaning and transport mechanism 324. The housing 322 may include one or more inlet openings 326 and one or more outlet openings 328.

The cleaning and transport mechanism 324 includes one or more features for dislodging contaminants and transporting contaminants toward the outlet opening 328. The cleaning and transport mechanism 324 may have any suitable configuration. In the embodiment shown, the cleaning and transport mechanism 324 includes one or more flutes 330 that extend at least partially between its first and second ends. The flutes 330 may have various cross sections. For example, the flutes 330 may be linear, non-linear, or spiral about the axis of rotation 18. The flutes 330 are adapted to move contaminants through the housing 322 toward the outlet opening 328 as described in more detail below.

The cleaning and transport mechanism 324 may include a cleaning member 332 disposed proximate an exterior surface 334. One or more cleaning members 332 may be disposed proximate each flute 330. The cleaning members 332 may have any suitable configuration, such as bristles, wipers, or flaps in any suitable combinations and configurations to facilitate movement of contaminants through the housing 322. The cleaning members 332 may be adapted to scrub an interior surface of the housing 322 or to dislodge contaminants from a surface of the machine tool.

A pressurized fluid system 334 that provides a pressurized fluid, such as air, $CO_2$, or a cleaning solution, may be provided to help move contaminants along each flute 330 toward the outlet opening 328. For instance, the pressurized fluid system 334 may provide air to or near the inlet opening 326. As the cleaning and transport mechanism 324 is rotated, a flute 330 intermittently or periodically aligns with at least a portion of the outlet opening 328, thereby permitting contaminants and air to exit the housing 322 through the outlet opening 328.

Figure 19:
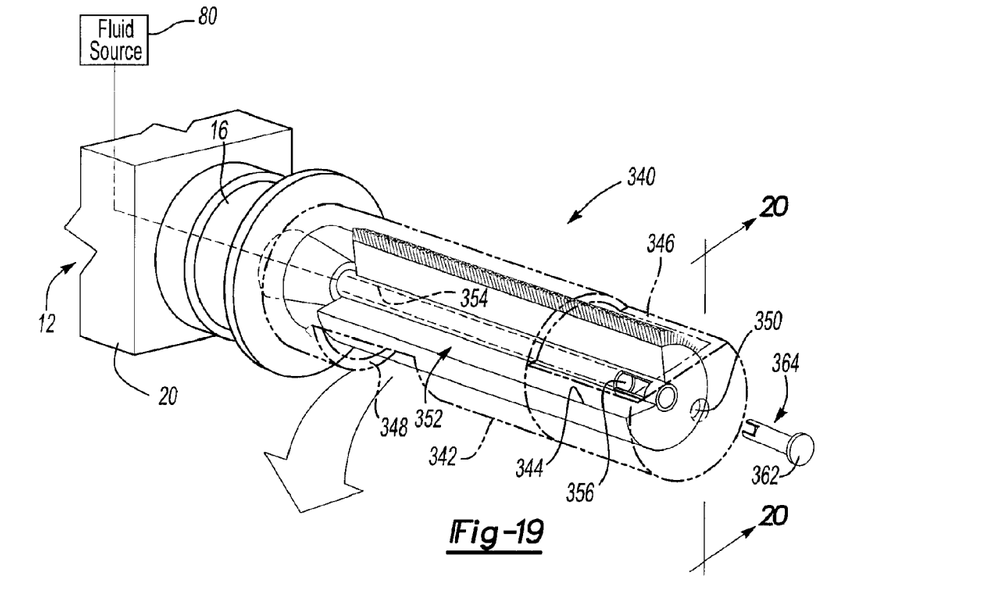
FIG. 19 is a perspective view of a sixteenth embodiment of the cleaning apparatus.
Figure 20:
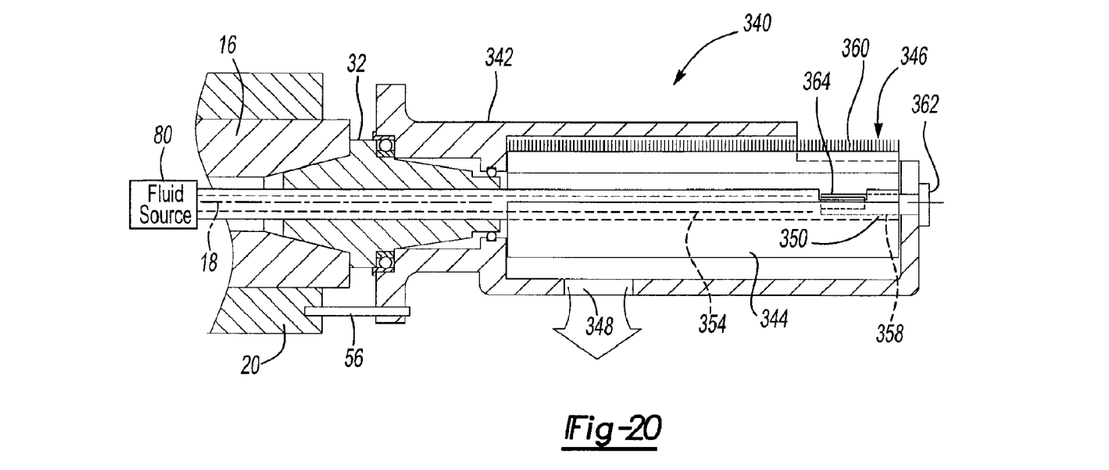
FIG. 20 is a section view of the cleaning apparatus shown in FIG. 19 along line 20-20.

Referring to FIGS. 19 and 20, another embodiment of a cleaning apparatus is shown. In this embodiment, the cleaning apparatus 340 includes a housing 342 and a cleaning and transport mechanism 344.

The housing 342 may include one or more inlet openings 346 and one or more outlet openings 348 as previously discussed. In addition, the housing 342 may include a plug opening 350.

The cleaning and transport mechanism 344 includes one or more features for dislodging contaminants and transporting contaminants toward the outlet opening 348. In the embodiment shown, the cleaning and transport mechanism 344 includes an open portion 352, a passage 354, a first opening 356, and a second opening 358. In addition, the cleaning and transport mechanism 344 may include one or more cleaning members 360 disposed on a surface as previously described.

The open portion 352 may have any suitable configuration. For example, the open portion 352 may be a cut-away or recess that extends axially as shown in FIG. 19. The open portion 352 is adapted to move contaminants through the housing 342 toward the outlet opening 348 as described in more detail below.

The passage 354 is adapted to provide a pressurized fluid, such as air, $CO_2$, or a cleaning solution, to help move particulates. The passage 354 may receive pressurized fluid from a fluid source as previously described. In the embodiment shown, pressurized fluid is provided through the coupling 32. The pressurized fluid may be selectively provided to the open portion 352 via the first opening 356.

A plug 362 may be provided to help control flow of the pressurized fluid. In the embodiment shown, the plug 362 is disposed proximate the plug opening 350 and second opening 358. The plug 362 includes an end having a notch 364. At least a portion of the notch 364 may be disposed at generally the same position as the first opening 356 along the axis of rotation 18. The plug 362 may be attached to the housing 342 and configured not to rotate with the cleaning and transport mechanism 344. As such, the notch 364 and first opening 256 are intermittently or periodically aligned to permit the flow of pressurized fluid when the cleaning and transport mechanism 344 is rotated. The plug 362 may be oriented to provided pressurized fluid during a portion of a revolution. For instance, the plug 362 may be configured to permit the flow of pressurized fluid when the open portion 352 is at least partially aligned with the outlet opening 348.

As such, the likelihood of blowing contaminants back toward the inlet opening 346 would be reduced.

Alternatively, embodiments may be provided without plug 362 and/or plug opening 350. For example, a valve or other device may be provided to control fluid flow or pressurized fluid may be permitted to flow on a continuous basis.

Figure 21:
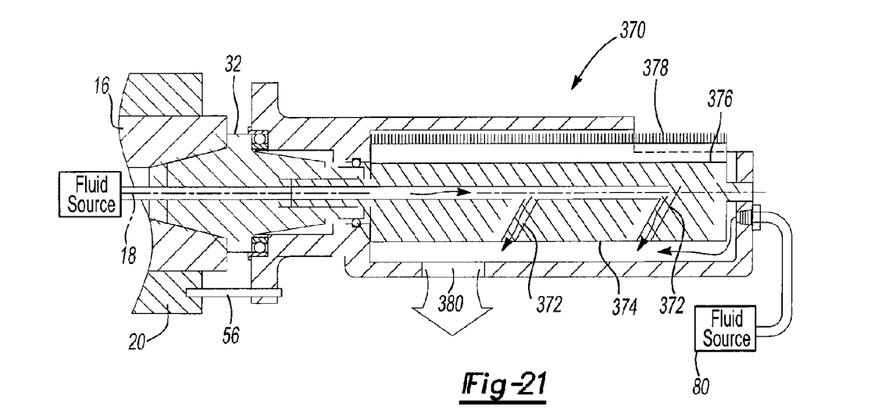
FIG. 21 is a section view of a seventeenth embodiment of the cleaning apparatus.

Referring to FIG. 21, another embodiment of a cleaning apparatus is shown. In this embodiment, the cleaning apparatus 370 is similar to that shown in FIGS. 19 and 20, but includes branch passages 372 that are configured to provide pressurized fluid at various points along the cleaning and transport mechanism 374. One or more branch passages 372 may be directed away from the open portion 376 of the cleaning and transport mechanism 374. For example, one or more branch passages 372 may be directed toward or through the cleaning member 378 to help dislodge contaminants and/or keep the cleaning member 378 clean. In addition, the branch passages 372 may be linear or may be curved or angled in various directions, such as toward the outlet opening 380 to help direct contaminants in a predetermined direction.

Figure 22:
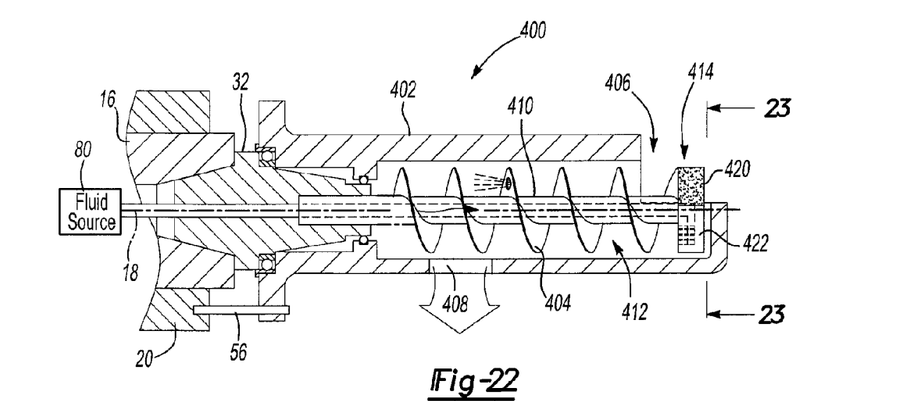
FIG. 22 is a section view of an eighteenth embodiment of the cleaning apparatus.
Figure 23:
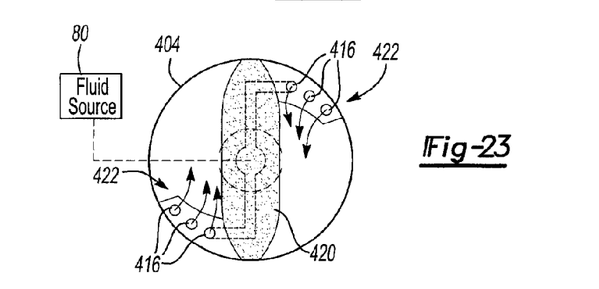
FIG. 23 is a perspective view of a portion of the cleaning apparatus shown in FIG. 22.

Referring to FIGS. 22 and 23, another embodiment of a cleaning apparatus is shown. In this embodiment, the cleaning apparatus 400 includes a housing 402 and a cleaning and transport mechanism 404. The housing 402 may include one or more inlet openings 406 and one or more outlet openings 408 as previously discussed.

The cleaning and transport mechanism 404 includes one or more features for dislodging contaminants and transporting contaminants toward the outlet opening 408. In the embodiment shown, the cleaning and transport mechanism 404 includes an internal passage 410, a body portion 412, and an end portion 414.

The internal passage 410 is adapted to provide a pressurized fluid, such as air, $CO_2$ or a cleaning solution, as previously described. The internal passage 410 may be connected to one or more branch passages 416 that provide the fluid to the body and/or end portions 412,414.

The body portion 412 may have any suitable configuration. In the embodiment shown in FIG. 22, the body portion 412 includes at least one helical surface 416 that facilitates the movement of contaminants toward the outlet opening 408 when the cleaning and transport mechanism 404 is rotated in a predetermined direction. Optionally, the helical surface 416 may include a cleaning member, such as bristles or a wiper.

The end portion 414 is adapted to dislodge contaminants from a surface. In the embodiment shown, the end portion 414 includes a plurality of cleaning members 420 and a blade portion 422 disposed proximate a distal end. Optionally, the blade portion 422 may be replaced by or supplemented with a cutting tool, such as a drill.

Referring to FIG. 23, and exemplary embodiment of a blade portion 422 is shown. The blade portion 422 may have any suitable configuration. In the embodiment shown, two blade portions are proximate ends of the helical surfaces 416. Each blade portion 422 may be provided at similar or different angles to help dislodge particulates from a housing surface. The blade portions 422 may be made of any suitable material, such as a metal or a polymeric material.

The branch passages 416 may be disposed proximate each blade portion 422 and/or the helical surface 416 to help to reduce clogging and help keep the blade surface clean. Any suitable number of passages may be provided. In the embodiment shown, three branch passages 416 are disposed proximate each blade portion 422.

A method for dislodging and moving contaminants from a machine tool surface using the cleaning apparatus embodiments previously described will now be discussed. The methodology discussed below is generally applicable for all embodiments configured to be mounted on a spindle.

First, the cleaning apparatus is coupled to the spindle with the coupling. Coupling may be accomplished manually or automatically, such as with an automated tool change mechanism and/or magazine as is known by those skilled in the art.

Second, the cleaning and/or transport mechanisms are powered or rotated using the spindle or another power source as previously described.

Third, the spindle assembly is positioned so that the cleaning apparatus is located adjacent to the surface or surfaces to be cleaned. As the cleaning and/or transport mechanisms are rotated, contaminants are dislodged and transported away from the surface. The spindle 16 may be rotated at a constant rotational speed or multiple rotational speeds. In addition, the spindle 16 may be "pulsed" to alter the rotational speed. Moreover, a counterweight may be provided to provide inertia to maintain rotation of the cleaning member. In addition, the spindle may rotate in different directions. For example, the spindle may alternate between clockwise and counterclockwise directions to scrub contaminants off surfaces of the machine tool.

Fourth, the spindle assembly and/or cleaning apparatus may be moved along one or more axes, such as X, Y, and/or Z axes, to dislodge and transport contaminants from various regions or machine tool surfaces. Moreover, the spindle assembly and cleaning apparatus may be continuously or intermittently actuated along an axis or combination of axes to contact and/or scrub a surface.

While the best mode for carrying out the invention has been described in detail, those familiar with the art to which this invention relates will recognize various alternative designs and embodiments for practicing the invention as defined by the following claims.

What is claimed is:

1. An apparatus for dislodging contaminants from a surface of a machine tool having a spindle, the apparatus comprising:
    a coupling configured to be mounted on the spindle;
    a housing disposed proximate the coupling, the housing having an inlet opening and an outlet opening;
    a cleaning mechanism for dislodging and directing contaminants into the inlet opening, the cleaning mechanism having an exterior surface and a cleaning member disposed proximate the exterior surface; and
    a transport mechanism adapted to move contaminants toward the outlet opening.

2. The apparatus of claim 1 wherein the housing does not turn when the coupling is rotated by the spindle.

3. The apparatus of claim 1 wherein the transport mechanism is coupled to the coupling and rotates when the spindle rotates.

4. The apparatus of claim 1 wherein the transport mechanism includes a helical surface that extends at least partially between the cleaning mechanism and the coupling, the helical surface being configured to move contaminants toward the outlet opening.

5. The apparatus of claim 1 further comprising a pressurized fluid system for providing a pressurized fluid into the housing to move contaminants.

6. The apparatus of claim 1 wherein the housing further comprises a flow restriction disposed between the cleaning mechanism and the transport mechanism.

7. The apparatus of claim 5 wherein the pressurized fluid is routed through the coupling.

8. The apparatus of claim 1 wherein the cleaning mechanism is configured to be rotated by the spindle.

9. The apparatus of claim 1 wherein the cleaning mechanism is partially disposed in the housing.

10. An apparatus for dislodging contaminants from a surface of a machine tool having a spindle adapted to rotate about an axis of rotation, the apparatus comprising:
    a coupling configured to be attached to the spindle;
    a housing disposed proximate the coupling and configured not to rotate about the axis of rotation, the housing having an inlet opening and an outlet opening;
    a cleaning mechanism disposed proximate the inlet opening and adapted to dislodging contaminants from the surface and direct contaminants into the housing; and
    a transport mechanism adapted to move contaminants through the housing toward the outlet opening;
    wherein the transport mechanism is configured to be actuated by the spindle.

11. The apparatus of claim 10 further comprising first and second cleaning mechanisms configured to rotate in opposite directions.

12. The apparatus of claim 10 further comprising a first cleaning mechanism and a second cleaning mechanism spaced apart from the first cleaning mechanism.

13. The apparatus of claim 10 wherein the inlet opening is disposed at a distal end of the housing disposed opposite the coupling.

14. The apparatus of claim 10 wherein the inlet opening is disposed between the coupling and a distal end of the housing.

15. The apparatus of claim 10 further comprising a power source for rotating the cleaning mechanism.

16. The apparatus of claim 10 wherein the cleaning mechanism is configured to rotate about a cleaning mechanism axis of rotation that is not disposed parallel to the axis of rotation of the spindle.

17. An apparatus for dislodging contaminants from a surface of a machine tool having a spindle, the apparatus comprising:
    a coupling configured to be mounted on the spindle;
    a housing disposed proximate the coupling, the housing having an inlet opening and an outlet opening;
    a cleaning mechanism for dislodging and directing contaminants into the inlet opening, the cleaning mechanism being moveably disposed on the housing; and
    a transport mechanism having a helical surface adapted to move contaminants from the inlet opening toward the outlet opening.

18. The apparatus of claim 17 wherein the cleaning and transport mechanisms are adapted to turn when the spindle rotates.

19. The apparatus of claim 17 wherein the cleaning mechanism includes an exterior surface and a cleaning member disposed proximate the exterior surface.

20. The apparatus of claim 19 wherein the cleaning member is a plurality of bristles.

* * * * *